July 22, 1930.   T. W. STONE   1,771,067
METHOD OF MAKING WATER GAS
Filed Oct. 24, 1923   3 Sheets-Sheet 1

Inventor:
Thomas W. Stone
by Munday Clarke & Carpenter Attys.

July 22, 1930.  T. W. STONE  1,771,067
METHOD OF MAKING WATER GAS
Filed Oct. 24, 1923   3 Sheets-Sheet 3
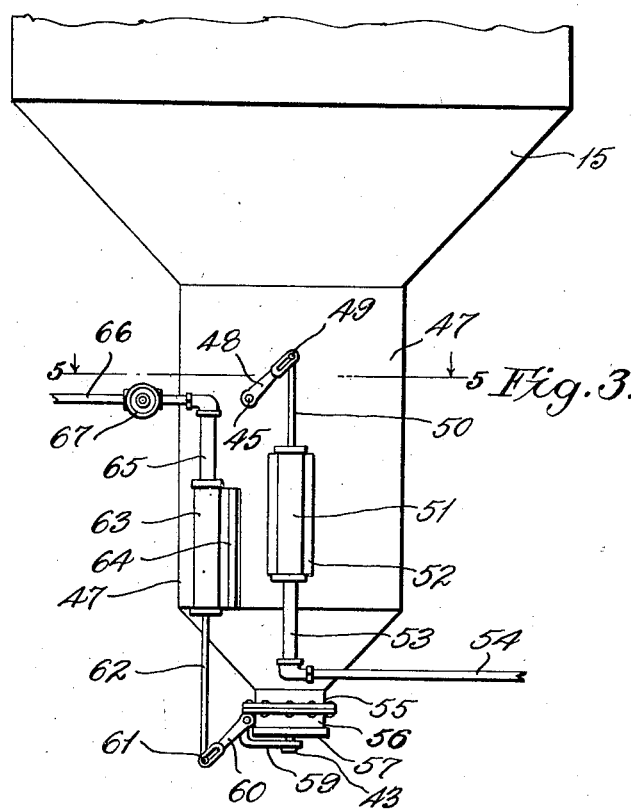
Fig. 3.
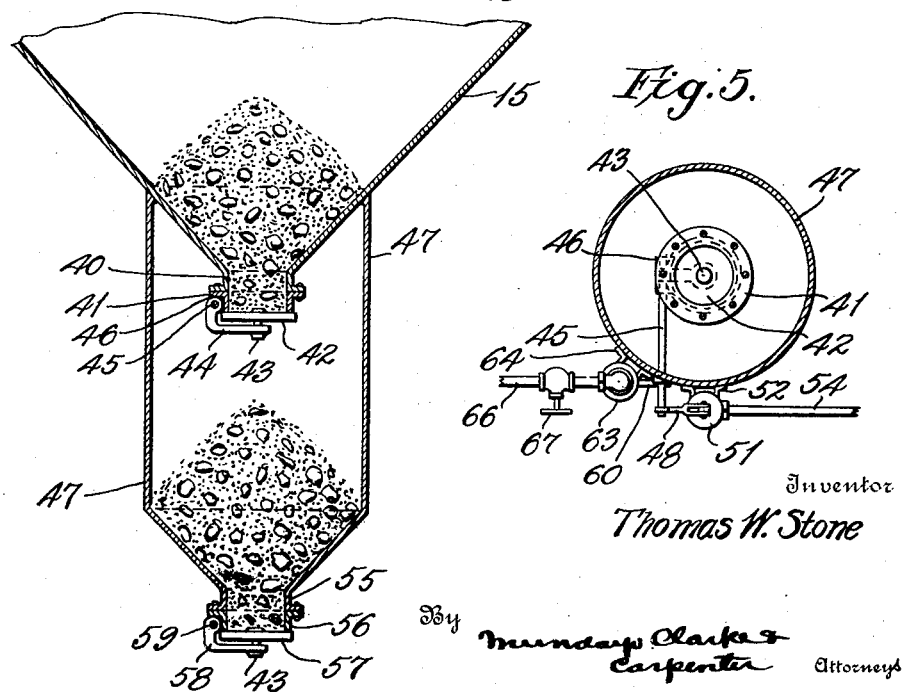
Fig. 4.
Fig. 5.
Inventor
Thomas W. Stone
By Munday Clarke & Carpenter
Attorneys Patented July 22, 1930

1,771,067

UNITED STATES PATENT OFFICE

THOMAS W. STONE, OF FORT WAYNE, INDIANA, ASSIGNOR TO THE WESTERN GAS CONSTRUCTION COMPANY, OF FORT WAYNE, INDIANA, A CORPORATION OF INDIANA

METHOD OF MAKING WATER GAS

Application filed October 24, 1923. Serial No. 670,572.

The invention relates to a method for producing gas and has particular reference to a method for obtaining water gas. The invention embodies in its essential characteristics a water gas generator so arranged as to produce water gas by what may be termed a self clinkering process and which briefly comprises either an up or a down air blast, or both, within the generator so controlled and directed as to prevent the formation of large bodies of clinker or molten slag within the fuel chamber of the generator with the consequent saving of expense in maintenance and operation of such generator, as well as delays occasioned by frequently discontinuing the operation of the generator to clear the apparatus of constantly forming masses of clinker, which shutting down and consequent delays necessitated by the formation of such clinker bodies is a great disadvantage, and which is incident to the manufacture of water gas under present methods of practice.

In order to produce commercial water gas under the present practice, an average temperature of from 1600 to 1800 degrees Fahr. is desirable in the fuel bed within the generator shell in order to properly dissociate the steam which is admitted to the fuel chamber and which coacts with the incandescent mass of coke or other combustible material to produce the water gas. In order to maintain this average temperature within the fuel bed it is necessary under present practice to maintain the bottom of said fuel bed at a temperature frequently as high as 2500 to 2600 degrees Fahr. The ash from coal or coke fuel melts or fuses into clinker at temperatures varying from 2100 to 2900 degrees Fahr., according to the percentage of iron, alumina, silicon, or other metallic base which is present in variable quantities within the ash. In the generators used, according to the present methods of practice, the very high temperature required to maintain the average temperature within the fuel bed, is within a zone of the generator immediately above and in direct contact with the accumulated ash where the incoming air offers the highest concentration of oxygen for stimulating combustion. The upper portion of the fuel bed is almost entirely heated by the sensible heat of the products of combustion from the intense combustion area described immediately above the ash pit. The fuel at the top of the fuel bed has the very lowest ash concentration, for example, possibly 10 parts of ash to 90 parts of fuel. This ash concentration gradually increases as the fuel settles downward to replace that removed by combustion near the base of the fuel chamber. This increase in ash concentration is comparatively slow in the upper portion of the fuel bed and proportionately more rapid in the lower portion. It is also more rapid along the side walls in the ordinary type of generator than through the center of the fuel bed. This is due to the fact that the coke or other fuel does not pack so tightly against the side walls as it does throughout the center of the bed and as a consequence an excess of air from the blast penetrates high up along the side walls and the combustion of fuel is high with resultant high temperatures. With the high rate of fuel combustion the ash concentration increases, and as a result of this peripheral zone of high temperature, a portion of the ash is fused into slag or clinker along the side walls. It is quite general practice to remove the clinker from the ordinary water gas generator about twice a day, that is to say, about once every ten hours, so that all the ash in the fuel that has been used for gas making during that period has accumulated in the base of the generator, just above the grate bars and immediately below and in contact with the very highest combustion zone or area in the entire fuel bed. This arrangement, which places the high temperature combustion zone and the high ash concentration at the same place in the generator, results in melting or fusing practically all of the ash into a slag. If on the other hand, the high temperature combustion zone and the high ash concentration were kept separate, the desirable average temperature of the fuel bed could be attained at a point entirely removed from the high ash concentration.

It is the object of the present invention to obviate the accumulation of ash and resultant formation of clogging masses of clinker, and this result is accomplished by producing the highest temperature zone at a point within the fuel bed separate and remote from the large ash accumulation, and the method of obtaining the same is briefly as follows:

The main portion of the air blast is passed downwardly through approximately two-thirds of the fuel constituting the upper portion of the fuel bed, and the high temperatures due to the intense combustion accompanying the air excess in the gases at their point of entrance to the fuel bed, will be maintained in this upper portion. The fuel gradually working downward will pass this zone of high temperature before the ash concentration has risen to more than say one-fourth to one-third of the fuel mass. Consequently in the event that the temperature in this highly heated zone should rise above 2100 or 2200 degrees Fahr., that is to say, to a point necessary to fuse ash of certain qualities, the concentration will not be sufficient to cause any considerable accumulation of fused parts, with the result that only relatively small and insignificant pieces of clinker will be formed. On the other hand the lower portion of the fuel bed, located directly above the grate, constitutes the highly heated temperature zone as heretofore, but will be subjected to a blast of less intensity than the aforesaid blast which passes through the upper portion of the fuel bed, and which lesser blast may be so regulated in amount as to completely consume the remaining combustile portion of the mass. However, this latter mentioned blast is not of sufficient intensity to raise the lower portion of the fuel bed to a temperature sufficient to cause the melting or fusing of the ash concentration, which of necessity is present in large quantities in this lower zone, for the reasons described above. Therefore by this improved process and the apparatus for carrying the same into effect, I obtain the saving and expense desired in an apparatus of this character, as well as other advantages which will be hereinafter apparent.

Certain of these disadvantages which I have obviated and which at the present time are incident to the manufacture of gas of this character, are set forth below.

The improved process described and carried out in the present invention results in the saving to a large extent of the very difficult labor necessary for removing the accumulation of clinkers from the apparatus and will permit said apparatus to be maintained in continuous operation for 24 hours per day instead of 20 hours, as heretofore. The avoiding of the accumulation of clinker in the bottom of the fuel chamber will permit of uniform distribution of the steam and air throughout the fuel bed during the entire operating period, which in itself materially increases the rate of gas making and the capacity of the set. By using the heat in the lower portion of the fuel bed to superheat the steam for gas-making, the steam will be raised to a temperature of 1000 or 1100 degrees Fahr. before it reaches the high temperature zone and the completeness of steam dissociation will be more complete than in the process employed at the present time in which an amount of steam considerably in excess of that actually required must be passed through the generator with resultant inherent losses. This saving in the use of extra steam effects a saving in the amount of fuel necessary to bring it to the required pressure. This excess of steam heretofore employed in passing through the fuel bed is of necessity raised to a temperature of approximately 1400 to 1500 degrees Fahr. with the result that it absorbs and carries away a certain amount of heat necessary in the fuel bed of the generator. The carrying away of this excess heat results in additional requirements for cooling and removing the steam at the outlet of the set in the tar batter and in the scrubbers, thus increasing the amount of pumping water required at these points.

The employment of the method and apparatus set forth in the present invention in conjunction with an automatic charger, enables fuel to be constantly fed into the generator at the time the "run" is on, and the apparatus may therefore remain in operation for sixty minutes per hour instead of approximately fifty-four minutes as heretofore.

A further object of the invention resides in the provision beneath the fuel beds of a continuously operating automatic ash discharging mechanism. This discharging mechanism is arranged to continuously remove the ash deposits constantly accumulating in the ash pit into a hopper that may be emptied continuously or intermittently by autocatic mechanism or manually. The provision of such a discharging mechanism permits the generator to be operated continuously and obviates the present disadvantages incident to frequent shutting down of the gas generator to permit the removal of ash deposits.

With such objects in view, as well as other advantages which may be incident to the use of the improvements, the invention consists in the parts and combinations thereof hereinafter set forth and claimed, with the understanding that the elements constituting the same may be varied in proportions and arrangement without departing from the nature and scope of the invention as hereinafter claimed.

In order to make the invention more clearly understood there are shown in the accompanying drawings means for carrying the same into practical effect, without limiting the improvements in their useful applications, to the particular constructions which, for the purpose of explanation, have been made the subject of illustration.

Referring to the drawings:—

Fig. 3 is an enlarged fragmentary view in vertical section showing the automatic ash discharging conveyor at the bottom of the generator.

Fig. 4 is a vertical sectional view taken through the center of Fig. 3.

Fig. 5 is a horizontal section on line 5—5 of Fig. 3.

Figure 1:
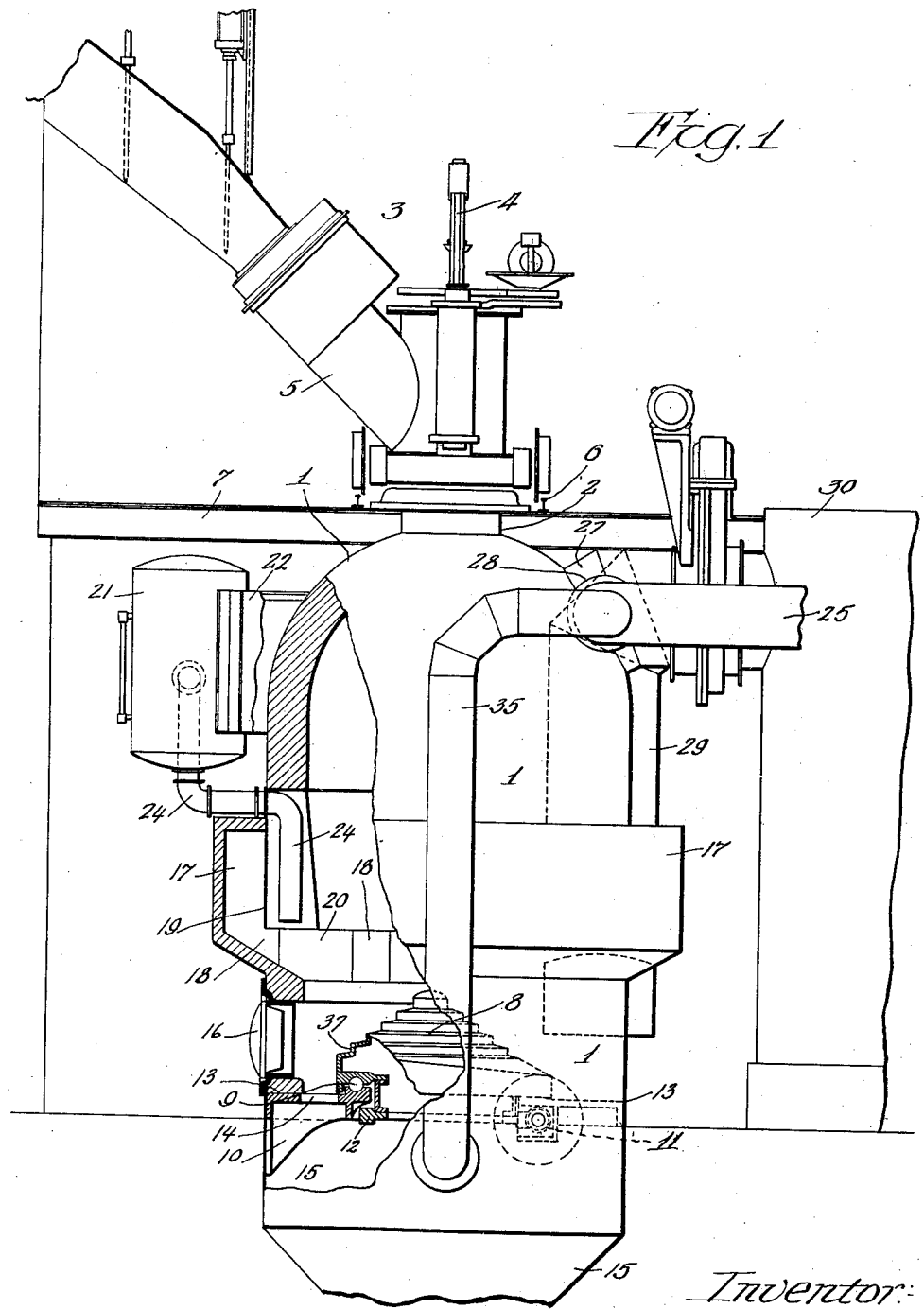
Fig. 1 is a side elevation, partially in vertical section, of a water gas generator to be used in conjunction with gas making apparatus and comprising the preferred embodiment of my invention.
Figure 2:
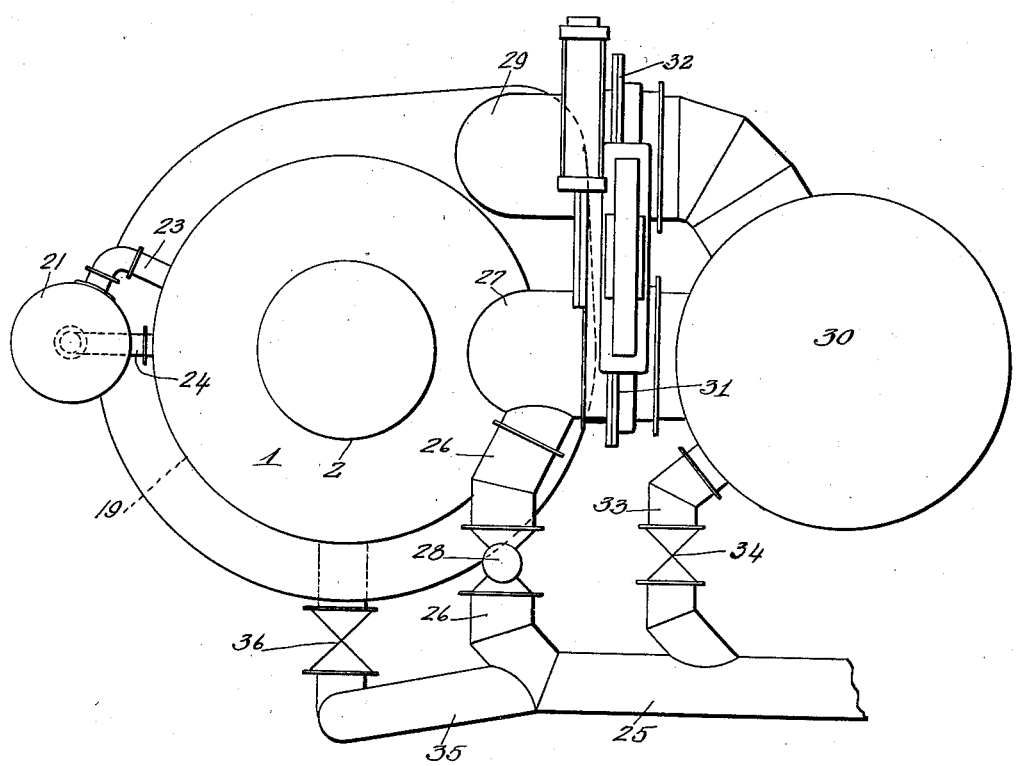
Fig. 2 is a plan view of the same, partially diagrammatic in character.

Referring to the drawings: 1 indicates a water gas generator shell of any preferred or well known construction and provided with a charging nozzle 2 at the top of the dome portion thereof. The portable automatic charging apparatus is indicated as an entirety by 3, the same being provided with suitable valve structure 4 and a chute 5 communicating with any desired source of fuel supply, and adapted to travel on rails 6 fixed on supporting beams 7 above the generator structure. This automatic charging apparatus and the valves for controlling the same forms the subject matter of Patent No. 1,597,314, and therefore will not be further described in detail.

The generator shell 1 is provided within its lower portion with a conical step grate 8 mounted eccentrically with respect to the shell on a ball race 9 suitably supported by the annular frame portion 10, preferably forming an integral portion of the apparatus. The conical step grate 8 is adapted to be rotated by external motor power driving a worm 11 meshing with a worm wheel 12 fixed to the base portion of the grate. The line of the grate is indicated at 13 and the latter is provided with an annular outlet 14 to permit the passage of ash and consumed fuel to the ash pit 15.

The generator shell is further provided with a plurality of clinker doors 16 suitably arranged about the periphery of the shell and the purpose of which is to permit access to the interior of the generator near the grate portion to remove any possible accumulation of clinkers or molten slag.

Located substantially intermediate the generator shell and preferably comprising an integral portion thereof is an annular collecting channel 17 having a plurality of ports 18 connecting with the interior of the fuel chamber. The inner wall of the annular channel 17 constitutes the outer wall of a second annular water leg or boiler shell 19 which is of smaller diameter than the channel 17 and located between the latter and the fuel bed at a point preferably directly above the communicating ports 18 connecting the chamber 17 with the fuel bed in the interior of the generator. The inner wall of the water leg or boiler shell 19 constitutes the wall of the fuel chamber and this boiler shell is supported by a plurality of piers 20 located around the periphery of the interior of the shell and which are of sufficient number and size to support the annular boiler and the shell structure. A steam drum 21 is located on the exterior of the generator and is suitably spaced from the walls thereof by the supporting structure 22. A steam pipe 23 establishes communication between the drum 21 and the annular boiler chamber 19, and a further return pipe 24 is provided connecting said boiler with the drum 21 to insure the active circulation of steam from the drum 21 through the chamber 19 and thence back to said drum.

The presence of the steam in the annular boiler chamber 19 serves to lower the temperature within the combustion chamber adjacent the upper portion of the fuel bed and around the periphery thereof. At this point the concentration of heat is the highest due to the fact that the fuel does not pack as tightly against the wall as it does in the central portion of the bed, and by reason of the lowered temperature due to the proximity of the circulating steam within the jacket 19 the fusion of the ash within the fuel chamber adjacent the side walls is minimized. The presence of this jacket 19 immediately adjacent the combustion chambers serves also to preheat the steam which is subsequently introduced into the lower portion of the generator for dissociation in contact in the incandescent fuel incidental to the production of gas.

A main air blast header 25 is suitably supported and located adjacent the generator structure and communicates by the branch 26 with the header 27 communicating with the upper portion of the fuel chamber within the shell 1 and at a point above the fuel bed. A blast valve 28 of suitable construction is located at a point on the branch pipe 26 between the header 25 and the point of discharge to the fuel chamber and serves to establish or prevent communication between the latter and the header 25 when desired. The products of the blast discharging through the pipe 26 into the fuel chamber are afforded means of outlet through the annular ports 18 into the collecting channel 17 and thence through a riser pipe 29 communicating with a carbureter 30. A hot valve 31 of usual construction is interposed within the header 27 to establish or prevent communication between the fuel chamber and the carbureter 30; and a similar valve 32 is provided within the riser pipe 29 to similarly control communication between the collecting channel 17 and the carbureter. A branch pipe 33 connects the header 25 with the carburetor 30 and is provided with a valve 34 for controlling communication between these elements. A secondary branch pipe 35, preferably of smaller diameter than the pipe 26, communicates at one end with the header 25 from whence a portion of the air blast is conducted downwardly on the exterior of the generator to a point of communication with the ash chamber 15 below the fuel chamber and the grate line 13. Communication between the ash pit 15 and the header 25 is governed by a blast valve 36 which is positioned within the branch pipe 35 at a point preferably adjacent its point of communication with the interior of the ash pit 15.

The operation of the generator and the devices for promoting the self-clinkering action of the same is as follows:

The interior of the shell is charged with coke or other fuel, by the automatic charging apparatus 3, to a point near the upper portion of the dome. The operation of generating the gases is a continuous cycle consisting of two periods similar to the process employed for ordinary water gas generation, namely the "blow" and the "run." The "blow" is accomplished by opening the blast valves 28 and 36. This permits a portion of the air from the header 25 to pass through the duct 26 into the upper portion of the fuel chamber and thence downwardly through the bed of fuel and through the ports 18 into the annular channel 17. The valve 31 being in closed position prevents any portion of the blast in the duct 26 from reaching the carburetor 30. At the same time by reason of the reducing diameter of the branch pipe 35, a smaller quantity of air is conducted into the ash pit 15. The air then passes vertically through the lower portion of the fuel bed to a point where it joins the downwardly descending gases above described and together therewith pass through the ducts 18 into the annular channel 17. These combined blast products are thence conveyed by the riser pipe 29 through the open hot valve 32 into the carburetor 30. This process is continued until the fuel bed within the generator has been raised to the proper gas-making temperature and by reason of the passage of a larger blast downwardly through the upper portion of the fuel bed as compared to the lesser volume passing through the lower portion thereof, the temperature in the upper portion of the bed will be considerably higher than that in the aforesaid lower portion. The result of passing the main portion of the blast downwardly through approximately the upper two-thirds of the fuel bed, that is to say, the portion of the bed above the ports 18, is that the high temperatures resulting from the intense combustion are retained in this upper portion, which high temperatures are due to the excess of air in the gases at their point of entrance to the fuel bed. The consumed fuel gradually working downward will pass by the ports 18 before the ash concentration has risen to more than one-quarter to one-third of the fuel mass, so that should the temperature in the upper portion of the fuel bed rise to a point above 2100 or 2200 degrees Fahr. sufficient to fuse certain quantities of ash, the latter will not be present in a sufficient amount to cause any considerable agglomeration of these fused quantities, and therefore only very small pieces of clinker or slag will be formed.

After the fuel has worked downward to the lower portion of the fuel bed, that is to say, the portion below the ports 18, the concentration of ash becomes much higher and, were it permitted to fuse, large pieces of clinker would be formed, clogging the apparatus and necessitating frequent shutting down of the set to remove the large agglomerated mass of clinkers which it is the object of the present invention to avoid. But, from the above description of the set it will be observed that the temperature in the lower portion of the fuel bed is much lower than that above the ports 18, such decrease in temperature being due to the lesser amount of blast admitted to the ash pit 15 and working upward through the grate to meet the downcoming blast described. Therefore, the temperature in the lower one-third is maintained below the point at which this large concentration of ash will fuse and therefore no resulting large clinkers or slag are formed in this portion of the bed where the ash is present in large quantities. The blast entering the lower portion of the fuel bed from the ash pit, while less intense than the blast admitted downwardly through said bed, will be proportioned sufficient in amount to entirely consume the remaining combustible portion of the fuel mass before the latter reaches the lower grate line.

When the desired temperatures in the incandescent fuel mass have been reached in the desired ratio, due to the distribution of the air blasts in the manner above described, the valves 28 and 36 are closed and the period of "blow" is ended.

The apparatus is now ready for the "run" which is accomplished in the usual manner and which consists in admitting steam from the annular boiler 19 to the ash pit 15 through any desired pipes (not shown).

The steam passes up through the grate, permeating the lower portion of the incandescent fuel bed, and fills the annular chamber 17, but is prevented from passing into the carburetor 30 by the valve 32, which is closed. On the other hand the valve 31 has been opened, and the steam therefore rises through the intensely heated fuel bed forming the gases which pass through the hot valve 31 into the carburetor. It will be understood that the dissipation of the steam, by reason of its contact with the incandescent fuel, results in the formation of water gases which are conducted to the carburetor as described. This operation is continued until it is again necessary to perform the air "blow" described above to preheat the fuel to the state of incandescence necessary for the efficient dissipation of the steam.

The conical grate 8 will be revolved at a regulated speed so as to discharge the ash at the grate line at such a rate that the amount of heat generated by burning the carbon in this mass after it passes the ports 18 will be approximately sufficient to superheat the gas making steam admitted to the ash pit 15. This heat is sufficient to raise the temperature of the steam to approximately 1100 degrees F. at the time it passes the ports 18 to enter the highly heated upper portion of the fuel bed.

The alternate low pressure air blasting and steaming described of the lower portion of the fuel bed prevents the temperature from reaching the fusing point of the ash, with the result that little or no clinker is formed in the fuel mass after it has passed below the ports 18.

The operation above described is termed the "up-run" in ordinary gas manufacture. Should it be desired to effect what is known as a "down-run," as is frequent in present practice, steam is admitted from the annular boiler 19 through suitable connections (not shown) into the space under the dome of the generator immediately above the fuel bed. The steam so admitted will pass downwardly through the upper two-thirds of the fuel bed and through the ports 18 into the collecting channel. This results from the fact that the valve 31 is at this time closed and the valve 32 is open. The outgoing gases collected in the channel 17 are conveyed through the riser pipe 29 through the open valve 32 and into the carburetor.

It may be desired to employ a "split-run." This would consist preferably of about one minute of "up-run", two minutes of "down-run", and a final minute, or three-quarters of a minute of "up-run". This could be accomplished by the manipulation of the various valves described in the manner to effect the various runs desired as will be readily understood. The various valves described are of the usual type employed in present practice in the generation of gases of the character used in connection with the present invention and are preferably automatic in their operation. They do not form an essential part of the present invention and therefrom the particular means of operating these various valves have not been described in detail.

The continued revolving of the eccentric grate 8 will cause the mass of the fuel and accumulated ash to work downwardly to be gradually discharged into the ash pit or hopper 15 at the base of the generator. The pit or hopper 15 is preferably of conical formation and at its lower reduced end terminates in a flanged discharge opening 40 having bolted thereto an annular collar 41 of similar diameter to the aperture or discharge opening 40. A valve 42 of suitable size to close the opening at the lower end of the hopper 15 is provided, having a central pivot 43 loosely secured in one end of an arm or hanger 44. The opposite end of the hanger 44 is pivotally secured between ears 46 preferably formed integrally with the collar member 41, the hinge pintle being preferably in the form of an elongated rod 45. The outer end of the latter projects through one wall of a second hopper 47 suitably secured to and disposed below the hopper 15 and at its outer extremity the hinge rod 45 has rigidly secured thereto one end of a slotted lever 48. The slotted portion of the lever 48 is operatively connected as at 49 with the upper end of a piston rod or plunger 50 projecting from a hydraulic cylinder 51 suitably supported as by a bracket 52 to the outer wall of the lower hopper 47. The fluid supply to the hydraulic cylinder 51 is obtained by means of a pipe 53 communicating with the lower end of the cylinder, which pipe is suitably connected to a second fluid supply pipe 54. The hydraulic cylinder 51 which operates the valve 42 is of preferance automatic in operation, that is, the valve 42 is designed to be opened and closed by the hydraulic power from the cylinder 51 at predetermined intervals, and this automatic operation is effected by connecting the end of the pipe 54 with the automatic timer of the gas generator set (not shown).

The lower end of the hopper 47 is of conical formation similar to the hopper 15 and terminates at its lower end in a flanged reduced aperature or discharge opening 55 to which is secured a collar 56 similar to the collar 41. A second valve 57 is designed to normally close the discharge opening provided at the lower end of the hopper 47 and is hingedly supported from the collar 56 in a manner similar to the valve 42, such hinge mounting being effected by means of a second arm or hanger 58 hingedly supported between ears on the collar 56 by means of a rod or pintle 59 similar to the rod 45. One end of a slotted lever 60 is rigidly secured to the rod 59 and at its other end the slotted portion of said lever operatively engages at 61 the lower end of a second piston rod 62 extending downwardly from a hydraulic cylinder 63 suitably supported as by brackets 64 to the outer side of the wall of the hopper 47 in a manner similar to the heretofore mentioned hydraulic cylinder 51. Fluid pressure to operate the cylinder 63 is admitted to the cylinder through a pipe 65 communicating with a second pipe 66 leading from any suitable source of fluid supply. The cylinder 63 which operates to open and close the lower valve 57 is preferably manually controlled as distinguished from the cylinder 51 which as aforesaid is automatically controlled. The flow of fluid to operate the cylinder 63 is manually controlled by means of a hand valve 67 located in any desired and convenient point on the supply pipes to the pressure cylinder.

The operation of the communicating hoppers 15 and 47 above described and the valves and operating mechanism connected therewith is as follows:

The constantly accumulating ash deposit in the hopper 15 is automatically discharged at predetermined intervals by means of the pressure cylinder 51 which operates to open the valve 52 to permit the discharge of said ash deposit into the lower hopper 47. After the ash has been discharged into the hopper 47 the valve 42 is automatically closed and at suitable intervals while said valve 42 is in closed position the valve 67 is manually operated to admit hydraulic pressure to the cylinder 63 which results in the lower valve 57 being opened to discharge the accumulated ash deposit from said hopper to the exterior of the generator. If desired a water seal may be employed to effectually prevent the escape of any gases from the interior of the generator during the discharge of the ash by the independent functioning of the valves 42 and 57. By loosely mounting the valves 42 and 57 on the hangers 44 and 58 by means of the pins 43, a tight fitting of the said valves against the discharge openings is insured.

My invention is hereinabove set forth as embodied in one particular form of construction, but I do not limit it thereto or to less than all the possible forms in which the said invention as hereinafter claimed may be embodied and distinguished from prior devices.

What I claim is:

1. In a method of making water gas from a bed of fuel in a gas generator that involves heating a portion of the fuel-bed to a temperature at which ash of the fuel fuses, the steps comprising: air-blasting the fuel-bed to heat it up; passing steam therethrough and thereby forming water gas; maintaining in the bottom of the fuel-bed a zone of high heat but below that at which ash thereof will become fused therein and subjecting said zone to a continuous agitation to agitate the fuel and ash therein and to cause a gradual descent of the fuel through said fuel-bed; continuously discharging ash and formed clinker from said agitating zone; and maintaining in a hotter zone, just above the agitation zone, the portion of the fuel bed that is heated to a temperature at which the ash fuses, so that ash and fuel from the hotter zone is subjected to the continuous agitating action of the agitation zone and large bodies of clinkers are prevented from forming during gradual descent of such ash and fuel in the upper portion of and through the relatively cooler agitating zone.

2. In a method of making water gas from a bed of fuel in a gas generator that involves heating a portion of the fuel-bed to a temperature at which ash of the fuel fuses, the steps comprising: air-blasting said fuel-bed to heat it up; maintaining in the bottom of the fuel-bed a zone of high heat but below that at which the ash thereof will become fused therein and subjecting said zone to a continuous agitation to agitate the fuel and ash therein and to cause a gradual descent of the fuel through said fuel-bed; continuously discharging ash and formed clinker from said agitating zone; maintaining, in a hotter zone, just above the agitation zone, the portion of the fuel-bed that is heated to a temperature at which the ash fuses, so that ash and fuel from the hotter zone is subjected to the continuous agitation of the agitating zone and large bodies of clinkers are prevented from forming during gradual descent of such ash and fuel in the upper portion of and through the relatively cooler agitating zone; forming the water gas from said fuel bed by up-runs and down-runs of steam through said bed; and making the up-runs with relatively lesser quantities of steam.

3. In the operation of a water gas set comprising a generator and a carburetter, the method which consists in: simultaneously passing a blast of air of relatively large volume into the top of a fuel bed and downwardly vertically through the greater vertical portion only thereof consisting mostly of fuel while passing a separate blast of air but of relatively smaller volume into the bottom of said fuel bed and upwardly vertically through the remaining but relatively smaller vertical portion only of said fuel bed consisting mostly of ash and flowing the air blast gas resulting from such air blasts off together from the fuel bed at substantially the region of juncture of the greater vertical portion consisting of mostly fuel with the remaining but smaller vertical portion of the fuel bed consisting of mostly ash; then discontinuing such air blasts and said off flow of gas at the region of juncture of said vertical portions; and then flowing steam vertically through the entire fuel bed and in and out through either of the opposite ends thereof and flowing off water gas resulting from said steam flow from either end of said fuel bed; whereby in the air blasting both vertical portions are heated up but so that said greater vertical portion of the upper part of the fuel bed, which is mostly fuel for gas generation, is brought for gas generation purposes up to above the temperature at which ash will fuse without also heating the relatively smaller vertical portion in the lower part of the fuel bed, which is mostly ash, up to a temperature which would cause fusion of the ash and clinker formation therein, and the steam flow for water gas generation passes vertically through the entire fuel bed from either end to the other and the water gas generated thereby be drawn off from either end of the fuel bed.

4. In the operation of a gas generator the method which consists in: simultaneously passing a blast of air of relatively large volume into the top of a fuel bed and downwardly vertically through the greater vertical portion only thereof consisting mostly of fuel while passing a separate blast of air but of relatively smaller volume into the bottom of said fuel bed and upwardly vertically through the remaining but relatively smaller vertical portion only of said fuel bed consisting mostly of ash and flowing the air blast gas resulting from such air blasts off together from the fuel bed at substantially the region of juncture of the greater vertical portion consisting of mostly fuel with the remaining but smaller vertical portion of the fuel bed consisting of mostly ash; whereby both vertical portions may be heated up but so that said greater vertical portion of the upper part of the fuel bed, which is mostly fuel for gas generation, may be brought for gas generation purposes up to above the temperature at which ash will fuse without also heating up the relatively smaller vertical portion in the lower part of the fuel bed, which is mostly ash, up to a temperature which would cause fusion of the ash and clinker formation therein.

5. A method as claimed in claim 4, and which includes generating steam by the heat in the wall of the generator at the region of juncture of said vertical portions where said air blast flows off, whereby the portion of said wall which is at such region and which is subjected to heat from both the fuel bed and the hot off flowing air blast gas is so kept cooled that clinker and ash will not fuse to such portion of the generator wall.

In testimony whereof I have hereunto set my hand.

THOMAS W. STONE.